(12) United States Patent
Chahwan

(10) Patent No.: US 9,013,825 B1
(45) Date of Patent: Apr. 21, 2015

(54) ELECTRONIC SYSTEM WITH VIBRATION MANAGEMENT MECHANISM AND METHOD OF OPERATION THEREOF

(71) Applicant: Western Digital Technologies, Inc., Irvine, CA (US)

(72) Inventor: Alain Chahwan, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/310,944

(22) Filed: Jun. 20, 2014

Related U.S. Application Data

(60) Provisional application No. 61/969,575, filed on Mar. 24, 2014.

(51) Int. Cl.
  G11B 21/02 (2006.01)
  G11B 5/58 (2006.01)
  G11B 5/012 (2006.01)
(52) U.S. Cl.
  CPC . *G11B 5/58* (2013.01); *G11B 5/012* (2013.01)
(58) Field of Classification Search
  CPC ........... G11B 5/59633; G11B 5/59666; G11B 5/59661; G11B 2020/1281; G11B 2220/2516; G11B 5/58; G11B 5/012; G11B 5/6005; G11B 5/54; G11B 5/6064; G11B 5/59655
  USPC .............. 360/75, 55, 51, 77.07, 77.08, 47.28; 714/6.3; 711/112; 369/44.34, 44.29, 369/44.35
  See application file for complete search history.

(56) References Cited

U.S. PATENT DOCUMENTS

| | | |
|---|---|---|
| 6,014,283 A | 1/2000 | Codilian et al. |
| 6,052,076 A | 4/2000 | Patton, III et al. |
| 6,052,250 A | 4/2000 | Golowka et al. |
| 6,067,206 A | 5/2000 | Hull et al. |
| 6,078,453 A | 6/2000 | Dziallo et al. |
| 6,091,564 A | 7/2000 | Codilian et al. |
| 6,094,020 A | 7/2000 | Goretzki et al. |
| 6,101,065 A | 8/2000 | Alfred et al. |
| 6,104,153 A | 8/2000 | Codilian et al. |
| 6,122,133 A | 9/2000 | Nazarian et al. |
| 6,122,135 A | 9/2000 | Stich |
| 6,141,175 A | 10/2000 | Nazarian et al. |
| 6,160,368 A | 12/2000 | Plutowski |
| 6,181,502 B1 | 1/2001 | Hussein et al. |
| 6,195,222 B1 | 2/2001 | Heminger et al. |
| 6,198,584 B1 | 3/2001 | Codilian et al. |
| 6,198,590 B1 | 3/2001 | Codilian et al. |
| 6,204,988 B1 | 3/2001 | Codilian et al. |
| 6,243,223 B1 | 6/2001 | Elliott et al. |

(Continued)

OTHER PUBLICATIONS

Imai, S., Burger, G. J., Lammerink, T. S. J., & Fluitman, J. H. J. (1997). Output characteristics of a thin-film piezoelectric AE sensor for magnetic head-disk interaction. JSME International Journal, Series C, 40(1), 33-41, which is described in US patent #:US 7,397,421.

*Primary Examiner* — Ali Neyzari

(57) ABSTRACT

An apparatus includes: a media; a head assembly over the media; a head actuation motor coupled to the head assembly; control circuitry, coupled to the head actuation motor, configured to position the head assembly; and a microphone, coupled to the control circuitry, configured to generate a signal in response to a vibration; and wherein: the control circuitry is further configured to: generate a compensation value based on the signal; and control the head actuator motor based on the compensation value.

22 Claims, 8 Drawing Sheets

(56) References Cited

U.S. PATENT DOCUMENTS

| | | |
|---|---|---|
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,847,597 B2 | 1/2005 | Kadlec et al. |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,139,401 B2 | 11/2006 | Culman et al. |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,397,421 B2 | 7/2008 | Smith |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,660 B2 | 11/2008 | Tanner |

(56) References Cited

U.S. PATENT DOCUMENTS

| | | |
|---|---|---|
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,112 B2 | 1/2009 | Tanner |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,528,525 B2 | 5/2009 | Smith et al. |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,633,704 B2 | 12/2009 | Supino et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,660 B1 | 4/2010 | Sutardja |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,885,151 B1 * | 2/2011 | Mitchem et al. .......... 369/44.34 |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,031,428 B1 | 10/2011 | Rutherford |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,085,492 B1 | 12/2011 | Cheung et al. |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,218,782 B2 | 7/2012 | Asada et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,158 B1 | 1/2014 | Chahwan et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,681,449 B1 * | 3/2014 | Adler et al. ................... 360/75 |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |

(56) References Cited

U.S. PATENT DOCUMENTS

| | | |
|---|---|---|
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 8,896,955 B1 | 11/2014 | Chen et al. |
| 2010/0035085 A1 | 2/2010 | Jung et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |

* cited by examiner

ELECTRONIC SYSTEM WITH VIBRATION MANAGEMENT MECHANISM AND METHOD OF OPERATION THEREOF

CROSS-REFERENCE TO RELATED APPLICATION(S)

This application claims the benefit of U.S. Provisional Patent Application Ser. No. 61/969,575 filed Mar. 24, 2014, and the subject matter thereof is incorporated herein by reference thereto.

TECHNICAL FIELD

An embodiment relates generally to an electronic system, and more particularly to a system for managing a response to external vibration sources.

BACKGROUND

Modern consumer and industrial electronic devices require storage of information, such as digital photographs, electronic mail, calendar, or contacts. These devices can be electronic systems, such as notebook computers, desktop computers, servers, televisions, and projectors, and are providing increasing levels of functionality to support modern life. Increased capacity and cost reductions are an ongoing market demand for storage in these systems.

Research and development in the existing technologies can take a myriad of different directions. One way to increase capacity and reduce cost at the same time is to store more information in a given area of the storage medium.

Audio-driven chassis-borne acoustic vibration can cause large tracking errors. These tracking errors can be compensated for by circuits that rely on expensive sensors, mounted on the printed circuit board assembly (PCBA), which have very limited bandwidth (~1600 Hz). The large tracking errors can cause failures such as "Blue/Black screen", "System Hang", "music/video skips" and generally poor performance. When a storage system is subjected to extreme vibration in for instance a notebook, netbook, TV, or server the storage system performance can be severely degraded.

DETAILED DESCRIPTION

Figure 1:
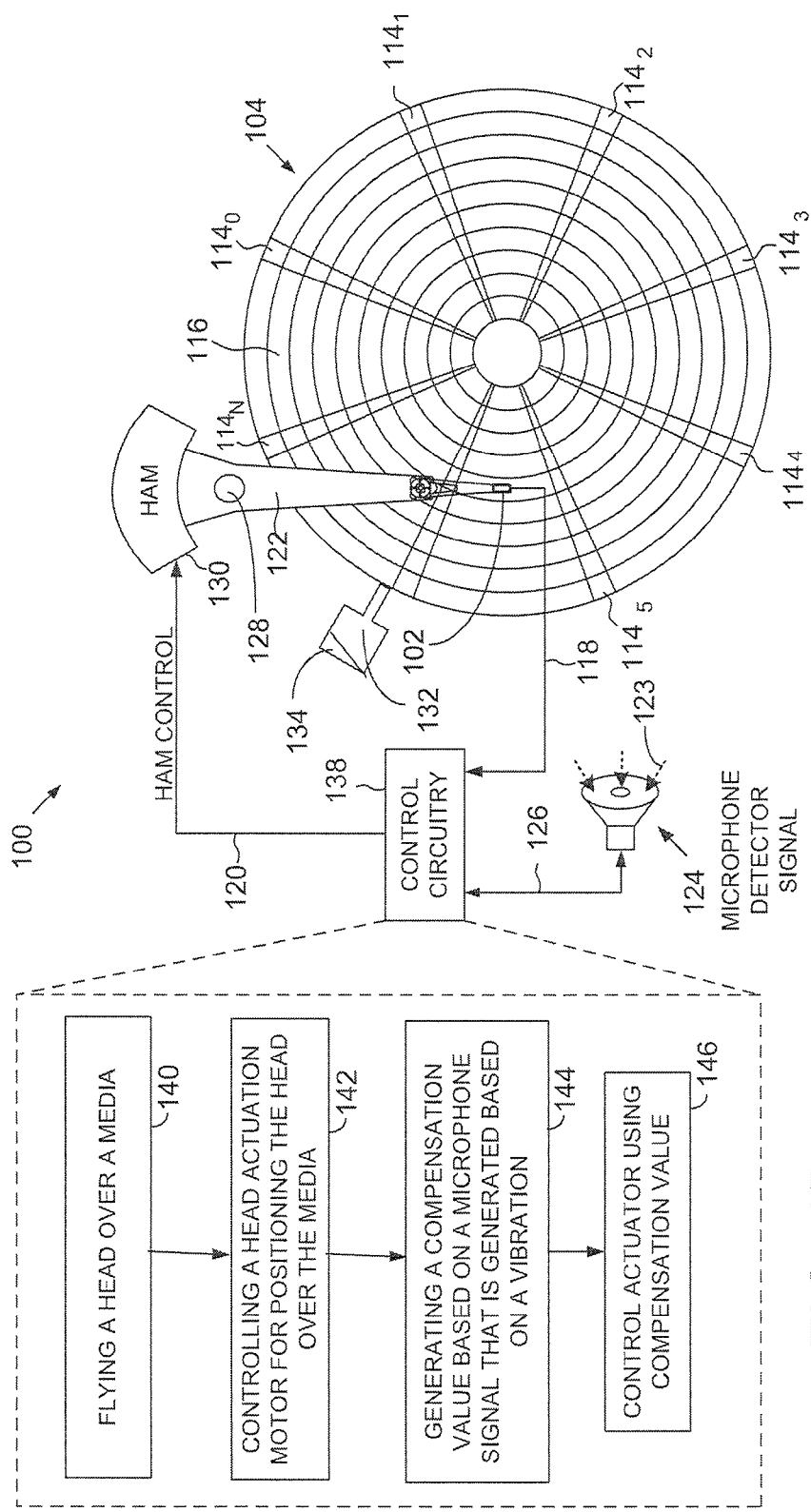
FIGS. 1A and 1B show an operational diagram of an electronic system as an embodiment.

A need still remains for an electronic system with preconditioned recording mechanism for reliably increasing capacity on the storage medium. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

Certain embodiments have other actions or elements in addition to or in place of those mentioned above. The actions or elements will become apparent to those skilled in the art from a reading of the following detailed description when taken with reference to the accompanying drawings.

The following embodiments are described in sufficient detail to enable those skilled in the art to make and use one of various embodiments. It is to be understood that other embodiments would be evident based on the present disclosure, and that system, process, or mechanical changes may be made without departing from the scope of an embodiment.

In the following description, numerous specific details are given to provide a thorough understanding various embodiments. However, it will be apparent that various embodiments can be practiced without these specific details. In order to avoid obscuring an embodiment, some well-known circuits, system configurations, and process actions are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, various embodiments can be operated in any orientation. The embodiments have been numbered first embodiment, second embodiment, etc. as a matter of descriptive convenience and are not intended to have any other significance or provide limitations for an embodiment.

The term "module" referred to herein can include software, hardware, or a combination thereof in an embodiment in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIGS. 1A and 1B, therein is shown an operational diagram of an electronic system 100 as an embodiment. The electronic system 100 can represent an apparatus for one of various embodiments. The one of various embodiments depicted in FIG. 1A is shown as a hard disk drive, as an example, although it is understood that the electronic system 100 as the various embodiments can be a tape drive, a desktop computer, a notebook computer, a server, a tablet, a television, a household appliance, or other electronic systems.

In one embodiment, the electronic system 100 comprises a head assembly 102, a media 104, a head actuation motor 130, such as a voice coil motor, a stepper motor, or a linear actuator motor, for actuating the head assembly 102 over the media 104, and control circuitry 138 comprising a servo control system for controlling the head actuation motor 130. In one embodiment, the control circuitry 138 is operable to execute the flow diagram of FIG. 1B wherein flying a head over a media as shown in block 140, controlling a head actuation motor for positioning the head over the media as shown in block 142, generating a compensation value based on a microphone signal that is generated based on a vibration as shown in block 144, and controlling the head actuation motor based on the compensation value as shown in block 146.

In one of various embodiments of FIG. 1A, the media 104 comprises embedded servo sectors $114_0$-$114_N$ that identify a plurality of servo tracks 114. The control circuitry 138 processes a read signal 118 coupled through the head assembly 102 to demodulate the servo sectors $114_0$-$114_N$ and generate a position error signal (PES) representing an error between the actual position of the head and a target position relative to a data track 116. The control circuitry 138 filters the PES using a compensation filter to generate a head actuation motor (HAM) control signal 120 applied to the head actuation motor 130, which rotates an actuator arm 122 about a pivot 128 in order to move the head assembly 102 radially over the media 104 in a direction that reduces the PES. The servo sectors $114_0$-$114_N$ can comprise any suitable position information, such as a track address for coarse positioning and servo bursts for fine positioning.

In one embodiment, the head assembly 102 can comprise a fly height actuator, such as a heater, or a piezoelectric actuator, operable to actuate the head vertically over the disk in order to maintain a target fly height. The head assembly 102 can also include a head gimbal assembly (HGA) and a head slider, which can comprise an air bearing surface (ABS), write circuitry, read circuitry, a laser, a position sensitive detector, or a combination thereof. The control circuitry 138 can comprise a servo control system operable to compare a measured fly height to a target fly height to generate a fly height error used to generate a fly height control signal similar to the servo control system that controls the radial position of the head assembly 102.

In one embodiment, the electronic system 100 of FIG. 1A is deployed in a system comprising a microphone 124, such as an electret condenser microphone, a piezoelectret microphone, or the like, that is driven by an acoustic vibration signal 123, such as an audio-induced vibration, airborne-noise induced vibration, or internally induced vibrations. By way of an example the audio induced vibration can be caused speakers housed in close proximity to the electronic system 100. As the volume of the speakers is increased, the acoustic vibration signal 123 can increase in amplitude, due to the speaker volume, until the control of the head actuation motor 130 is adversely affected. By further example, the internally induced vibrations can be caused by the head assembly 102 impacting a loading ramp 132 during an unload operation, the head assembly 102 impacting an outer diameter crash stop (ODCS) 134, or the head assembly 102 impacting the media 104.

In one embodiment, the microphone 124 is mounted, for example, on an exterior surface of the printed circuit board (PCBA) facing away from the chassis, though other locations may be used also in other embodiments. The acoustic vibration signal 123 can create undesirable vibrations that manifest as a disturbance in the servo control system(s) used to position the head assembly 102 over the media 104 (radially and/or vertically) if not addressed. The acoustic vibration signal 123 can also indicate the head assembly 102 has impacted the loading ramp 132, the media 104, or the ODCS 134. To compensate for this disturbance, the acoustic vibration signal 123 as received by the microphone 124 is evaluated by the control circuitry 138 in order to generate compensation values applied to the servo control system(s). In one embodiment, the compensation values comprise feed-forward compensation values that effectively anticipate and compensate for the effect of the disturbance.

One of various embodiments can provide a method of using the microphone 124, such as an electret or piezoelectret microphone, as a sensor for feed-forward compensation in the electronic system 100 to compensate for the acoustic vibration signal 123, such as the audio-induced vibration or the airborne-noise induced vibration. A microphone detector signal 126 of the microphone 124 can be applied to an adaptive filter in order to produce a feed-forward signal designed to offset the effects of the acoustic vibration signal 123. The adaptive filter adjusts its parameters based on the microphone detector signal 126 of the microphone 124, the position error signal of the servo system, and an estimate of the transfer function relating the actual position signal to the feed-forward signal.

It has been discovered that the microphone detector signal 126 of the microphone 124 can provide a higher bandwidth and more accurate response, for compensating the control of the head actuation motor 130, than prior art sensors in the presence of the acoustic vibration signal 123. The microphone 124 can be positioned to detect the acoustic vibration signal 123 with minimal impact to the design of the electronic system 100.

It has also been discovered that one of various embodiments can provide manufacturing quality and reliability data not previously available by characterizing the acoustic vibration signal 123 during load/unload testing of the head assembly 102. The control circuitry 138 can monitor the microphone detector signal 126 in order to differentiate impact between the head assembly 102, the loading ramp 132, the media 104, or a combination thereof. The control circuitry 138 can use the microphone detector signal 126 to control the actions of the head actuation motor 130, log reliability information, initiate diagnostic processes, or a combination thereof.

By monitoring the microphone detector signal 126 and detecting the impact between the head assembly 102 and the loading ramp 132 during an unload cycle, the control circuitry 138 can dynamically brake the head actuation motor 130 in order to minimize the impact velocity between the head assembly 102 and the ODCS 134. The reduced velocity impact between the head assembly 102 and the ODCS 134 can reduce the audible noise of the unload and extend the usable life of the electronic system 100 by minimizing the stress on the head assembly 102.

Figure 2:
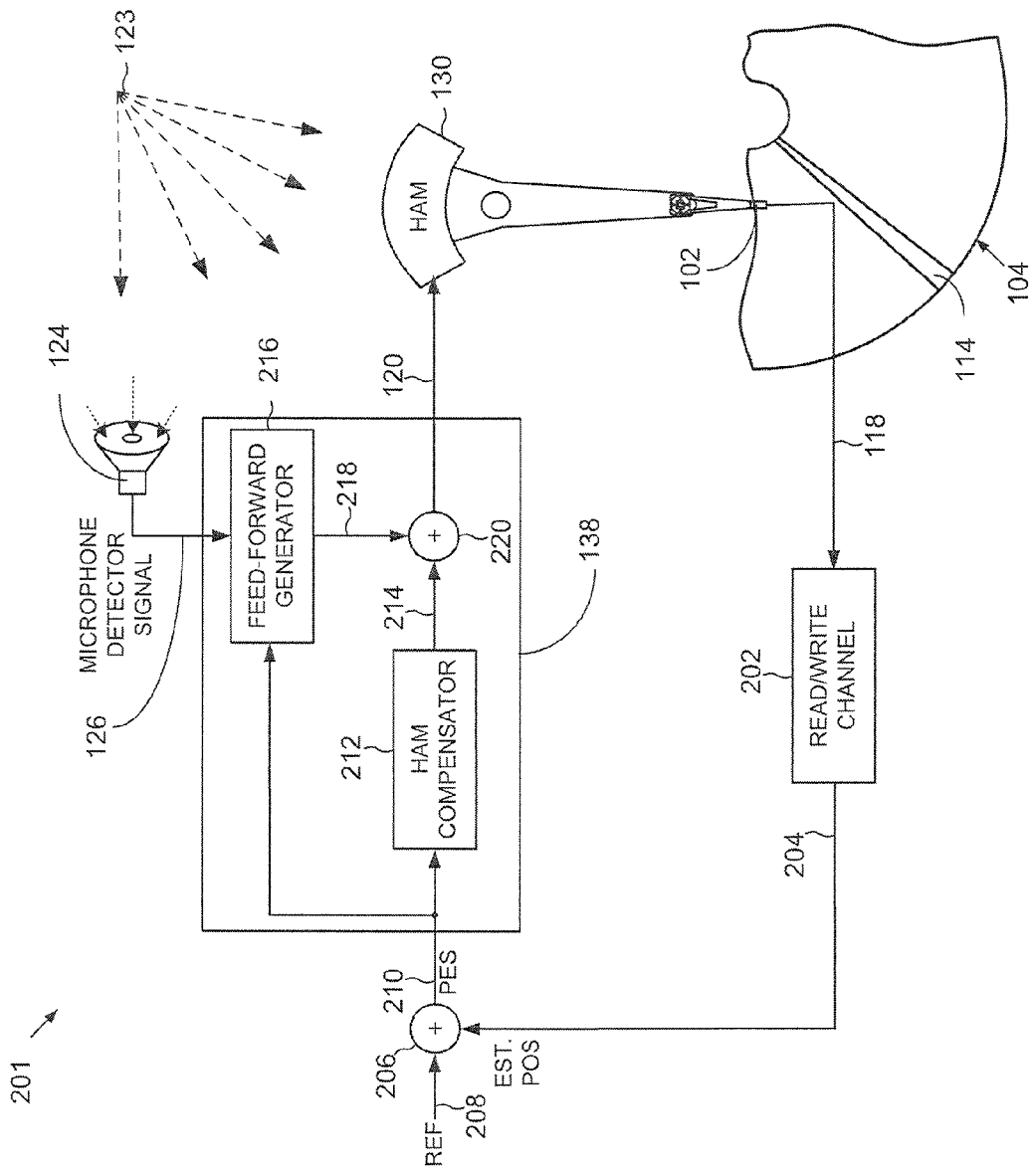
FIG. 2 shows elements of a servo control system for providing feed-forward compensation values according to one embodiment.

Referring now to FIG. 2, therein is shown elements of a servo control system 201 for providing feed-forward compensation values, in accordance with one embodiment. The servo control system 201 for controlling the head actuation motor 130 in order to position the head assembly 102 radially over the media 104. A read/write channel 202 demodulates the read signal 118 into an estimated position 204 for the head assembly 102 relative to the data track 116 of FIG. 1A on the media 104. The estimated position 204 is applied to a first adder 206 for subtracting a reference position 208 in order to generate a position error signal (PES) 210. A HAM compensator 212 processes the PES 210 to generate a coarse HAM control signal 214. A feed-forward generator 216 processes the PES 210 and the microphone detector signal 126 of the microphone 124 to generate feed-forward compensation values 218. The feed-forward compensation values 218 and the coarse HAM control signal 214 are applied to a second adder 220 in order to generate the HAM control signal 120.

It has been discovered that the acoustic vibration signal 123 can be monitored by the microphone 124 for generating the feed-forward compensation values 218 to prevent large tracking errors normally observed when the acoustic vibration signal 123 induces chassis borne acoustic vibrations.

Figure 3:
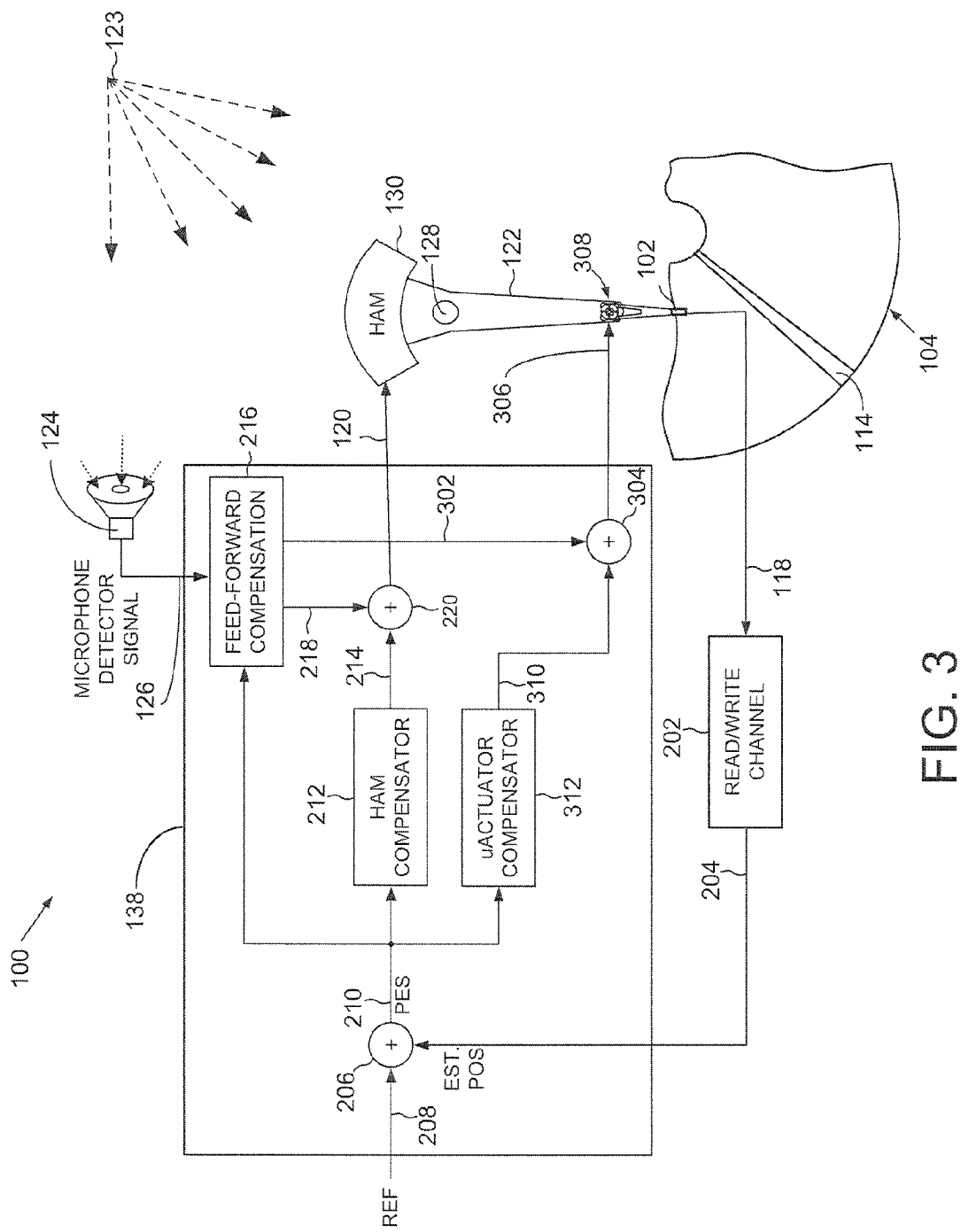
FIG. 3 shows elements of the servo control system, including a fine-positioner, for providing feed-forward compensation values according to one embodiment.

Referring now to FIG. 3, therein is shown elements of the servo control system according to one embodiment, including a fine-positioner 308, for providing feed-forward compensation values 302. One of various embodiments comprises the fine-positioner 308, such as a piezoelectric actuator, a micro-actuator, or a milli-actuator, for positioning the head assembly 102 in fine movements radially over the media 104.

In one of various embodiments, the fine-positioner 308 actuates a suspension relative to the actuator arm 122. However, the fine-positioner 308 can be implemented in a different manner, such as the fine-positioner 308 that actuates an attaching gimbal of the head assembly 102 relative to the actuator arm 122.

A fine-positioner compensator 312 processes the PES 210 to generate a coarse fine-positioner control 310. The feed-forward generator 216 generates the feed-forward compensation values 218 for the head actuation motor 130 and feed-forward compensation values 302 for the fine-positioner 308 in response to the PES 210 and the microphone detector signal 126 of the microphone 124 in response to the acoustic vibration signal 123. A third adder 304 can combine the coarse fine-positioner control 310 and the feed-forward compensation values 302 for generating a fine-positioner control signal 306.

It is understood that the servo control system previously described can reside within the control circuitry 138. The microphone 124 can be coupled to the feed-forward generator 216 within the control circuitry 138.

Figure 4:
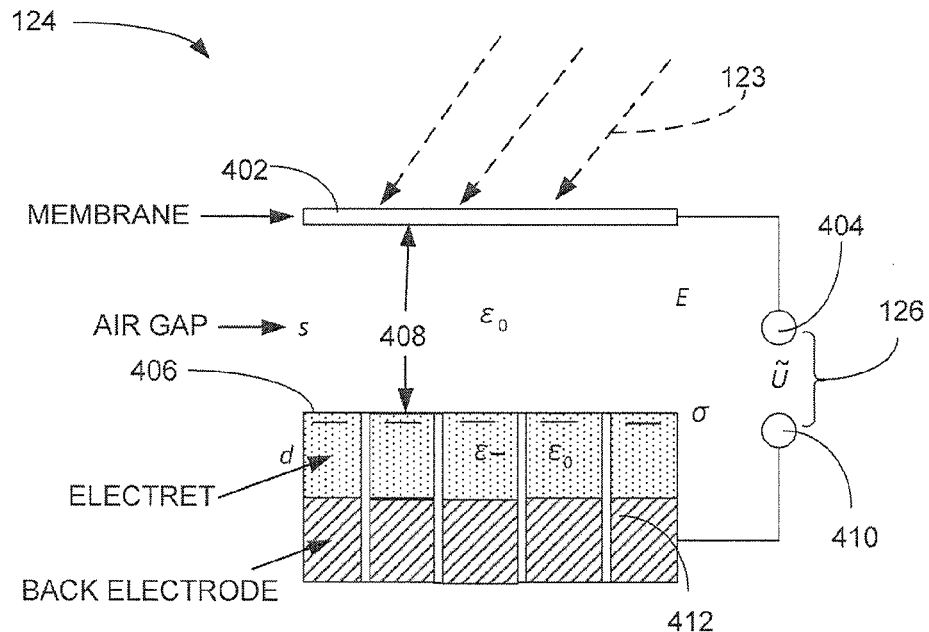
FIG. 4 shows a schematic representation of the microphone as used in one of various embodiments.

Referring now to FIG. 4, therein is shown a schematic representation of the microphone 124 as used in one of various embodiments. A membrane 402 can be coupled to a first electrical contact 404. The membrane 402 can be spaced above an electret contact 406 by an air gap 408.

The electret contact 406 can be coupled to a second electrical contact 410. The first electrical contact 404 and the second electrical contact 410 can provide the microphone detector signal 126 in response to vertical movement of the membrane 402 caused by the acoustic vibration signal 123. A back electrode 412 can be attached to a reference voltage on a printed circuit board (not shown).

It is understood that other types of the microphone 124 can be used to implement one of the various embodiments. The performance of the microphone 124 can improve the ability of the electronic system 100 to withstand the acoustic vibration signal 123 without experiencing large position error failures.

Figure 5:
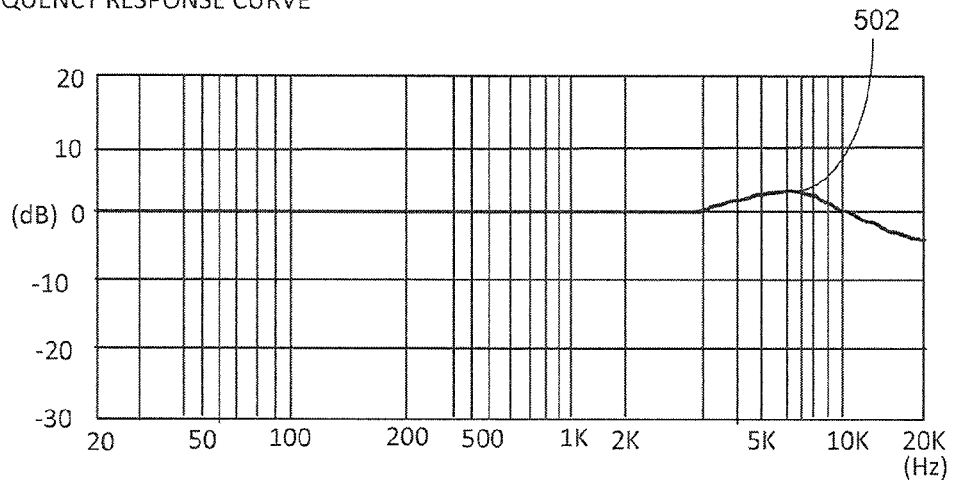
FIG. 5 is an exemplary frequency response curve for the microphone according to one embodiment.

Referring now to FIG. 5, therein is shown an exemplary frequency response curve 502 for the microphone 124 of FIG. 1A. The exemplary frequency response curve 502 for the microphone 124 that is substantially flat between 50 Hz and 20K Hz. The frequency response of the microphone 124 can provide an accurate sampling of the acoustic vibration signal 123 of FIG. 1A at frequencies beyond that which the servo mechanics can respond. This will allow accurate generation of the feed-forward correction signal and dramatically reduce or eliminate the occurrence of the large tracking errors caused by the acoustic vibration signal 123.

Figure 6:
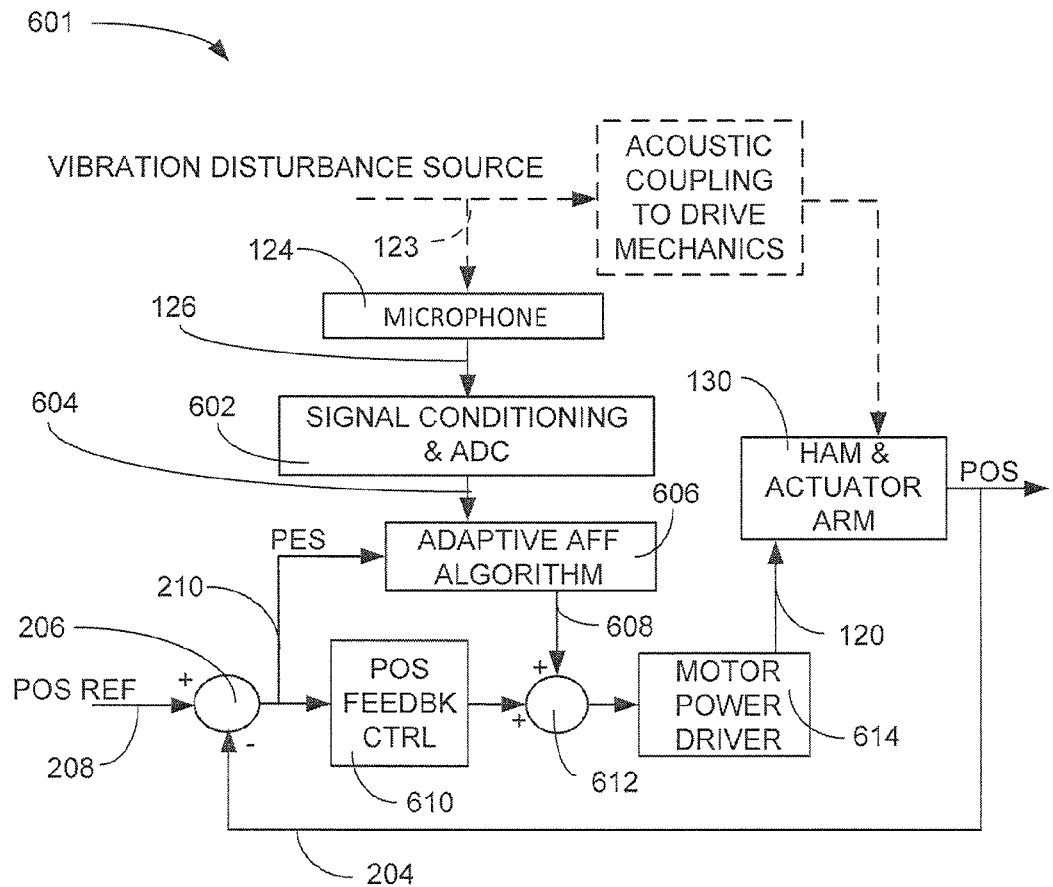
FIG. 6 is a block diagram of an embodiment of a microphone feed-forward circuit according to one embodiment.

Referring now to FIG. 6, therein is shown a block diagram of an embodiment of a microphone feed-forward circuit 601. The microphone detector signal 126 of the microphone 124 of FIG. 1A can be conditioned by a conditioning circuit 602, such as a band-pass filter coupled to an analog-to-digital converter (ADC).

In an embodiment, a conditioned signal 604 is then applied to an adaptive filter 606, such as a filtered-X least mean squared (LMS) filter, that produces a feed-forward signal 608 designed to offset the effects of the acoustic vibration signal 123. The feed forward signal 608 is added to the output of the position feedback control module 610 by an adder 612 and applied to a motor power driver circuit 614.

The motor power driver circuit 614 can provide the HAM control 120 for communicating with the head actuation motor 130.

In an embodiment, the adaptive filter 606 adjusts its parameters based on the output of the microphone 124 (conditioned and sampled), the position error signal 210 of the servo system, and an estimate of the transfer function relating the actual position signal 204 to the feed-forward signal 608.

Figure 7:
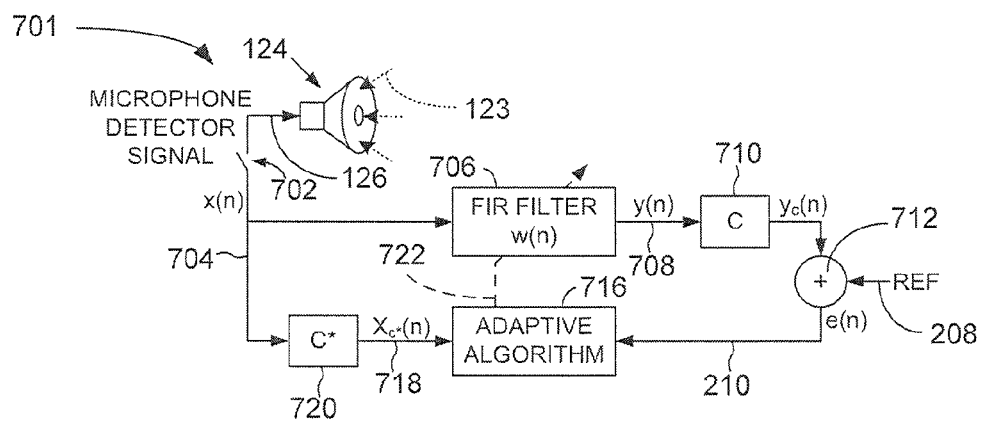
FIG. 7 is a functional block diagram of an embodiment for adaptively generating feed-forward compensation values for the servo control system(s) according to one embodiment.

Referring now to FIG. 7, therein is shown a functional block diagram of an embodiment for adaptively generating feed-forward compensation values for the servo control system(s). In an embodiment, the microphone detector signal 126 of the microphone 124 is sampled by the switch 702 to generate a sequence of digital values x(n) 704 that are filtered by a finite impulse response (FIR) filter 706 to generate feed-forward compensation values y(n) 708 applied to the plant C 710 representing, for example, the head actuation motor 130.

In an embodiment, the output $y_c(n)$ of the plant C 710 is subtracted from the position reference 208, by an adder 712, to generate an error signal e(n) 210 (e.g., the PES of the HAM servo control system). The digital values x(n) 704 of the microphone detector signal 126 are applied to a model C* 720 of the plant C 710 to generate a sequence of digital values $X_C*(n)$ 718 representing the estimated effect the digital values x(n) 704 have on the plant C 710.

In an embodiment, an adaptive algorithm unit 716 processes the digital values $X_C*(n)$ 718 and the error signal e(n) 210 in order to adapt 722 the FIR filter 706 toward a state that minimizes the error signal e(n) 210. In one embodiment, the goal is to minimize a cost function $J(n)=E[e(n)^2]$, where:

$$y(n)=w^T(n)x(n) \quad \text{(Equation 1)}$$

$$e(n)=d(n)-y_c(n) \quad \text{(Equation 2)}$$

$$x_{c^*}(n) = \begin{bmatrix} \sum_{i=0}^{l-1} c_i^* x(n-i) \\ \sum_{i=0}^{l-1} c_i^* x(n-i-1) \\ \vdots \\ \sum_{i=0}^{l-1} c_i^* x(n-i-M-1) \end{bmatrix} \quad \text{(Equation 3)}$$

In the above equations, d(n) represents the reference signal 208 and w represents the vector of coefficients in the FIR filter 706. To find the optimal coefficients of the FIR filter the gradient method is used as described by:

$$\nabla_{w(n)} J(n) = 2E[e(n)\nabla_{w(n)} e(n)] \quad \text{(Equation 4)}$$

which results in:

$$w(n+1) = \gamma w(n) + \mu x_c^*(n)e(n) \quad \text{(Equation 5)}$$

where γ represents the leakage factor and μ represents the step size. The above described adaption algorithm unit 716 is based on a known filtered-X LMS algorithm. However, the feed-forward compensation values 722 may be generated using any suitable algorithm.

In one embodiment, the adaptive algorithm unit 716 for generating the feed-forward compensation 722 values may be tuned during a calibration procedure while generating a predetermined microphone detector signal 126 (e.g., a sinusoid at a predetermined frequency). In another embodiment, the algorithm for generating the feed-forward compensation values may be continuously adapted during normal operation so as to adapt the system to the current operating environment, including the current spectral components of the output of the microphone 124.

Figure 8:
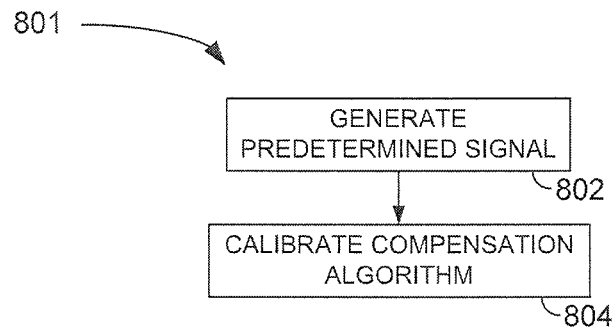
FIG. 8 show a flowchart of a method for calibrating one or more parameters of the algorithm that generates the compensation values based on the output of the microphone according to one embodiment.

Referring now to FIG. 8, therein is shown a flowchart of a method 801 according to one embodiment for calibrating one or more parameters of the algorithm that generates the compensation values based on the output of the microphone 124. The output of the microphone 124 is generated as a predetermined signal (block 802), such as a sinusoidal signal having a predetermined frequency. A parameter of the compensation algorithm is calibrated in response to the output of the microphone 124 (block 804), such as calibrating a feed-forward generator in response to the error signal (e.g., PES) induced by the predetermined signal. The output of the microphone 124 may comprise any predetermined signal having any desirable spectral components, including an impulse signal that may be used to measure the frequency response of the system.

Figure 9:
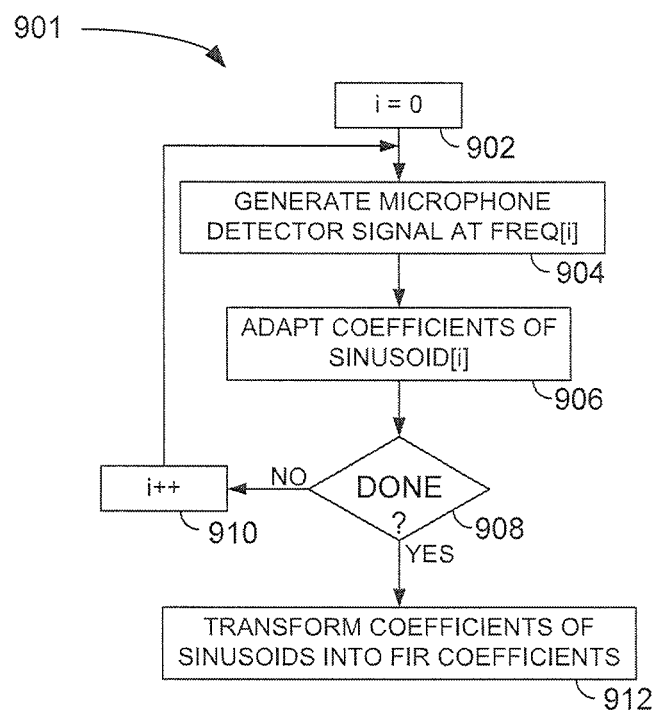
FIG. 9 shows a flowchart of a method, according to another of the embodiments, for calibrating the compensation values based on the output of the microphone.

Referring now to FIG. 9, therein is shown a flowchart of a method 901, according to another embodiment of the present invention, for calibrating the compensation values based on the output of the microphone 124. An index i is initialized to zero (block 902), and the output of the microphone 124 is generated as a sinusoidal signal at the index frequency (block 904). Coefficients of a compensation sinusoid are then adapted (block 906) so as to drive the error signal (e.g., PES) toward zero. The flow diagram is then repeated (block 908) including after incrementing the index i (block 910) starting with (block 904) so as to generate a set of coefficients of compensation sinusoids corresponding to the different frequencies of the output of the microphone 124. The set of coefficients are then transformed into a form for generating the compensation values during normal operation, such as transforming the set of coefficients into coefficients of an FIR filter (block 912).

The control circuitry 138 of FIG. 1A may be employed to implement the flow diagrams in one of various embodiments of the present invention, such as an integrated circuit or circuits. For example, the control circuitry 138 may be implemented within a read/write channel integrated circuit, or in a component separate from the read/write channel, such as a disk controller, or certain actions described above may be performed by a read/write channel and others by a disk controller. In one of the various embodiments, the read/write channel and disk controller are implemented as separate integrated circuits, and in an alternative embodiment they are fabricated into a single integrated circuit or system on a chip (SOC). In addition, the control circuitry 138 may include a preamp circuit implemented as a separate integrated circuit, integrated into the read/write channel or disk controller circuit, or integrated into an SOC.

In one of the various embodiments, the control circuitry 138 comprises a microprocessor executing instructions, the instructions being operable to cause the microprocessor to perform the actions of the flow diagrams described herein. The instructions may be stored in any non-transitory computer-readable medium. In one embodiment, they may be stored on a non-volatile semiconductor memory external to the microprocessor, or integrated with the microprocessor in a SOC. In another embodiment, the instructions are stored on the media 104 of FIG. 1A and read into a volatile semiconductor memory when the electronic system 100 is powered on. In yet another embodiment, the control circuitry 138 comprises logic circuitry, such as state machine circuitry.

One of various embodiments previously described has many aspects including but not limited to the following:

An embodiment of the microphone provides high bandwidth sensing (~12 kHz) more than the prior art sensors which are limited to ~1600 Hz.

An embodiment of the microphone 124 has a smaller surface area than the prior art sensor scheme.

An embodiment of the microphone 124 provides better correlation between the acoustic vibration signal 123 of FIG. 1A and PES 210 of FIG. 2 than prior art sensors.

The microphone 124 can reduce cost.

An embodiment of the microphone 124 significantly reduces or eliminates the occurrence of system failures, such as "blue/black screen", system hang, music/video skips, and poor performance, when the electronic system 100 is subjected to the acoustic vibration signal 123, for example in a notebook, a netbook, or a TV, caused by playing music at maximum speaker volume.

One of various embodiments of the signal conditioning (bandpass filter) and the firmware algorithm to implement the scheme to use the microphone detector signal 126 of FIG. 1A as a feed-forward signal of the electronic system 100 to compensate for the acoustic vibration signal 123 in laptops/TV's/tablets can provide an overall servo control output (TRO) attenuation that exceeds 15 dB.

Figure 10:
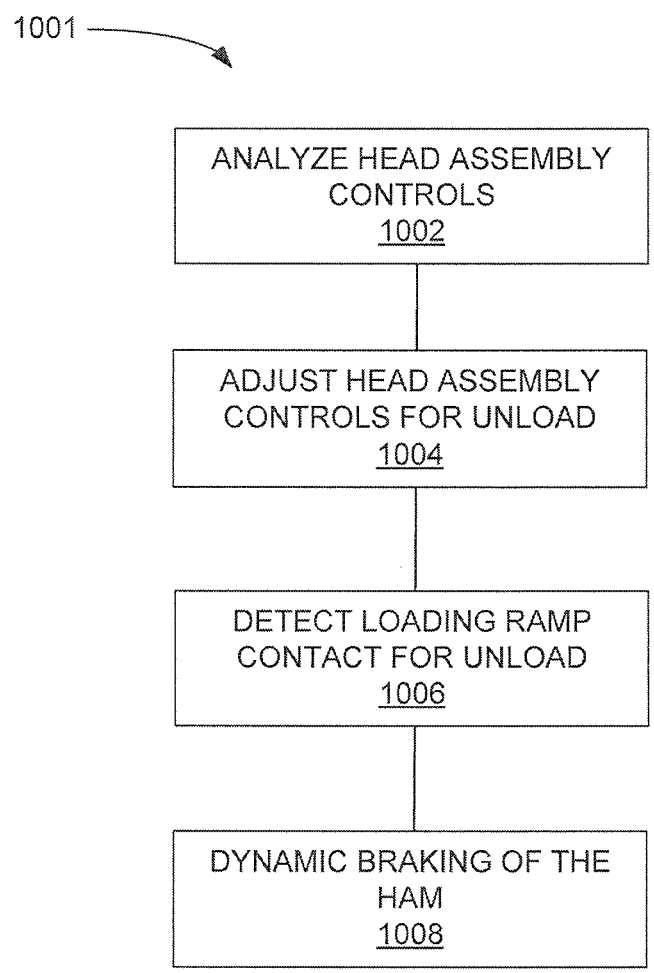
FIG. 10 shows a flow chart of a method, according to another of the embodiments, for managing the head assembly during unload cycles.

Referring now to FIG. 10, therein is shown a flow chart of a method 1001, according to another of the embodiments, for managing the head assembly 102 of FIG. 1A during unload cycles. The flow chart of the method 1001 depicts an analyze head assembly controls action (1002), in which the control circuitry 138 of FIG. 1A can monitor the microphone detector signal 126 of FIG. 1A in order to characterize the head assembly 102.

During the manufacturing process, the control circuitry can map pitch static attitude (PSA) and roll static attitude (RSA)

of the head assembly 102 in order to identify the best settings for the head assembly 102 during unload processes for each individual instance of the head assembly 102. The analyze head assembly controls action (1002) can optimize the angular position and attitude of the head assembly relative to the loading ramp 132 of FIG. 1A during the unload cycle. The optimized values can be saved to the media 104 of FIG. 1A for later use.

An adjust head assembly controls action (1004), in which the control circuitry 138 can retrieve the optimized values for adjusting the head assembly 102 in preparation for actively unloading the head assembly 102 to the loading ramp 132. During the operation of the electronic system 100 of FIG. 1A the control values of the head assembly can be modified to meet the requirement of operation of the electronic system 100. Upon receiving an unload indication, either by host command or power down, the control circuitry can reload the optimized values for unloading the head assembly 102.

A detect loading ramp contact for unload action (1006) can execute, during the unload cycle, by the control circuitry 138 monitoring the microphone detector signal 126 in order to detect the initial impact between the head assembly 102 and the loading ramp 132. Upon the initial impact, the control circuitry 138 can identify an increase in current of the HAM control signal 120 due to the resistance of the loading ramp 132 on the head assembly 102 before proceeding to a dynamic braking of the head actuation motor action (1008).

In the dynamic braking of the head actuation motor action (1008), the control circuitry can actively decelerate the head actuation motor 130. The deceleration of the head actuation motor 130 can prevent high velocity impact between the head assembly 102 and the ODCS 134. The dynamic breaking of the head actuation motor 130 can reduce the amount of force dissipated when the head assembly 102 does impact the ODCS 134. During normal operation, the dynamic breaking of the head actuation motor 130 can stop the progress of the head assembly 102 before the ODCS 134 is contacted.

It has been discovered that various embodiments can provide a manufacturing screening process for the electronic system 100. The control circuitry 138 can establish thresholds for determining the stability or instability of the head assembly 102 during the unload cycle in the back-end of line manufacturing testing.

In the field, during user operations, the control circuitry 138 can track the acoustic response of the head assembly 102 as it interacts with the loading ramp 132. An increasing acoustic response, detected through the microphone detector signal 126, can provide the control circuitry 138 with an early warning mechanism of possible compromise of the head assembly 102, the media 104, or a combination thereof.

Figure 11:
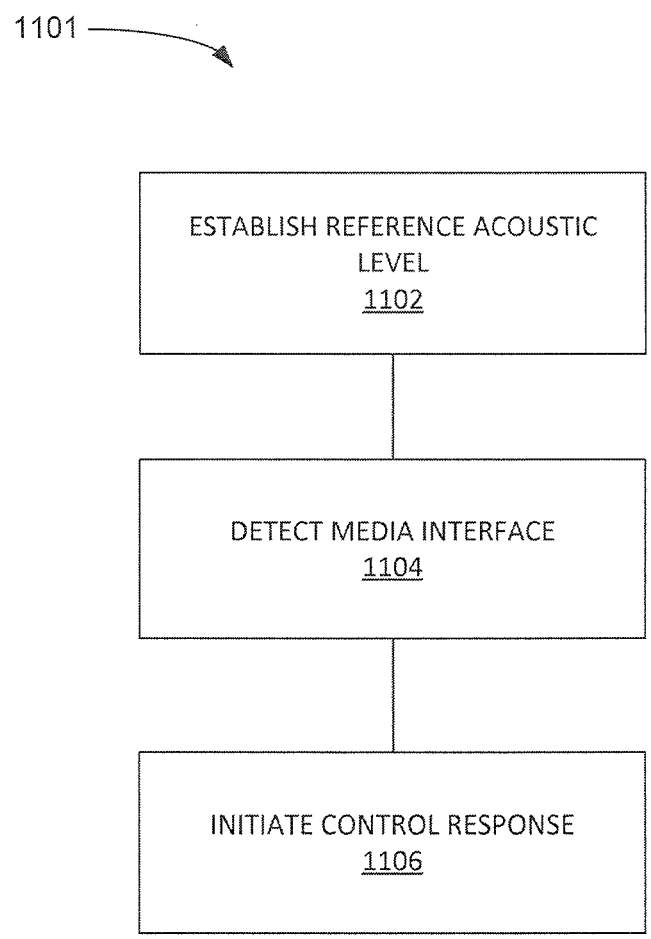
FIG. 11 shows a flow chart of a method, according to another of the embodiments, for managing the microphone detector signal.

Referring now to FIG. 11, therein is shown a flow chart of a method 1101, according to another of the embodiments, for managing the microphone detector signal 126 of FIG. 1A. The flow chart of a method 1101 depicts an establish reference acoustic level action (1102), in which the quiescent state of the electronic system 100 of FIG. 1A can be established by the monitoring the microphone detector signal 126. A recursive root mean squared (RMS) algorithm can be used to establish the reference acoustic level for the state of the electronic system 100.

In a detect media interface action (1104), the control circuitry can monitor the microphone detector signal 126 for evidence of an impact with the media 104. By way of an example, if the head assembly 102 of FIG. 1A is parked on the loading ramp 132 of FIG. 1A and the media 104 of FIG. 1A is moving at the required speed, the control circuitry 138 of FIG. 1A can record the microphone detector signal 126 to establish the reference acoustic level. A load command can cause the control circuitry 138 to move the head assembly 102 from the loading ramp 132 to fly over the media 104. During the transition from the loading ramp 132 to the media 104, it is possible for the head assembly 102 to impact the media 104. The acoustic response of the impact between the media 104 and the head assembly 102 can be detected through the microphone detector signal 126. The control circuitry 138 can be configured to log the event as an error or in the case of severe impact can initiate a diagnostic process to determine the level of damage caused by the impact. In a similar manner, the microphone detector signal 126 can be used to detect contact between the head assembly 102 and the media 104 during an unload cycle.

By way of another example, the head assembly 102 can be flying over the media 104 when the electronic system 100 can be subjected to a shock event. The shock event can be the result of dropping the electronic system 100 for example. During the shock event the media 104 can be impacted by the head assembly 102, the loading ramp 132, or both. The impact can be detected through the microphone detector signal 126 and recorded by the control circuitry 138. The level of the acoustic response to the shock event can determine the action of the control circuitry 138.

In an initiate control response action (1106), the control circuitry 138 can establish the level of the impact between the media 104, the head assembly 102, the loading ramp 132, or the combination thereof. The control circuitry 138 can determine the required response from the severity of the impact. For minor impacts, an error counter can be incremented to acknowledge the detection of the shock event. In the case of a severe impact the control circuitry 138 can take diagnostic or recovery actions in order to prevent additional damage. By way of an example, the control circuitry 138 can detect a shock event while the head assembly is in contact with the loading ramp 132. In this event the control circuitry 138 can move the head assembly 102 up the loading ramp 132 to the ODCS 134. Other diagnostic actions can include performing write and read operations in a reserved portion of the media 104.

It has been discovered that the electronic system 100 can respond to shock events of various severity in order to increase the reliability of the unit. The control circuitry can be configured to establish level thresholds for various shock events and qualify the appropriate response to protect the head assembly 102 and the media 104.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment is that it valuably supports and services the historical trend of reducing costs, simplifying systems, and increasing performance.

These and other valuable aspects of an embodiment consequently further the state of the technology to at least the next level.

While the various embodiments have been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An apparatus comprising:
a media;
a head assembly over the media;
a head actuation motor coupled to the head assembly;
control circuitry, coupled to the head actuation motor, configured to position the head assembly; and
a microphone, coupled to the control circuitry, configured to generate a signal in response to a vibration; and
wherein:
the control circuitry is further configured to:
generate a compensation value based on the signal; and
control the head actuator motor based on the compensation value.

2. The apparatus as claimed in claim 1 further comprising a read channel, coupled to the control circuitry, configured to demodulate servo sectors on the media for estimating a position of the head assembly.

3. The apparatus as claimed in claim 1 wherein the control circuitry is further configured to control the head actuator motor by calculating a head actuation motor control for accelerating the head assembly based on a position error signal and the compensation value.

4. The apparatus as claimed in claim 1 wherein the control circuitry is further configured to calculate a fine-positioner control for adjusting a position of the head within a data track on the media.

5. The apparatus as claimed in claim 1 wherein the control circuitry is further configured to calculate a position error signal from an estimated position and a reference position.

6. The apparatus as claimed in claim 5 wherein the control circuitry is further configured to scale the compensation value based on the position error signal.

7. The apparatus as claimed in claim 5 wherein the compensation value comprises a feed-forward compensation value scaled by the position error signal.

8. The apparatus as claimed in claim 1 wherein the control circuitry further comprises a feed-forward generator configured to generate a feed-forward compensation value, the control circuitry further configured to:
generate a position error signal representing a difference between an estimated position of the head assembly and a reference position; and
adapt the feed-forward generator based on the compensation value and the PES.

9. The apparatus as claimed in claim 1 wherein the control circuitry is further configured to adapt a feed-forward generator during a calibration procedure when the microphone detects a predetermined signal.

10. The apparatus as claimed in claim 1 wherein the microphone comprises an electret microphone.

11. The apparatus as claimed in claim 1 wherein the control circuitry is further configured to monitor the vibration caused by impact between the head assembly, a loading ramp, the media, or a combination thereof.

12. A method of operating an apparatus, the method comprising:
flying a head assembly over a media;
controlling a head actuation motor for positioning the head assembly over the media;
generating a compensation value based on a microphone signal that is generated based on a vibration; and
controlling the head actuation motor based on the compensation value.

13. The method as claimed in claim 12 further comprising demodulating servo sectors on the media for estimating a position of the head assembly.

14. The method as claimed in claim 12 wherein controlling the head actuation motor based on the compensation value further comprises calculating a head actuation motor control for accelerating the head assembly based on a position error signal and the compensation value.

15. The method as claimed in claim 12 further comprising calculating a fine-positioner control for adjusting a position of the head assembly within a data track on the media.

16. The method as claimed in claim 12 further comprising calculating a position error signal from an estimated position and a reference position.

17. The method as claimed in claim 16 wherein the compensation value is scaled based on the position error signal and a reference position.

18. The method as claimed in claim 16 wherein the compensation value comprises a feed-forward compensation value scaled by the position error signal.

19. The method as claimed in claim 12 further comprising:
generating a position error signal representing a difference between an estimated position of the head assembly and a reference position; and
adapting a feed-forward generator based on the compensation value and the PES.

20. The method as claimed in claim 12 further comprising adapting a feed-forward generator during a calibration procedure when the microphone detects a predetermined signal.

21. The method as claimed in claim 12 wherein the microphone includes an electret microphone.

22. The method as claimed in claim 12 further comprising monitoring the vibration caused by impact between the head assembly, a loading ramp, the media, or a combination thereof.

* * * * *